United States Patent
Agata et al.

(10) Patent No.: US 10,371,911 B2
(45) Date of Patent: Aug. 6, 2019

(54) OPTICAL FIBER CORD AND METHOD OF MANUFACTURING OPTICAL FIBER CORD

(71) Applicant: FUJIKURA LTD., Tokyo (JP)

(72) Inventors: Katsushi Agata, Sakura (JP); Norihiro Momotsu, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/842,276

(22) Filed: Dec. 14, 2017

(65) Prior Publication Data

US 2018/0196211 A1 Jul. 12, 2018

(30) Foreign Application Priority Data

Jan. 10, 2017 (JP) ................................. 2017-001734

(51) Int. Cl.
G02B 6/44 (2006.01)

(52) U.S. Cl.
CPC .......... *G02B 6/443* (2013.01); *G02B 6/4472* (2013.01); *G02B 6/4486* (2013.01); *G02B 6/4403* (2013.01); *G02B 6/4475* (2013.01)

(58) Field of Classification Search
CPC ........................... G02B 6/4472; G02B 6/4471
See application file for complete search history.

(56) References Cited

U.S. PATENT DOCUMENTS

| | | | | |
|---|---|---|---|---|
| 4,989,945 A * | 2/1991 | Ohkura | ............... | G02B 6/3878 385/39 |
| 5,386,485 A * | 1/1995 | Saito | ............... | G02B 6/3502 385/135 |
| 7,054,536 B2 * | 5/2006 | Sun | ............... | G02B 6/4476 385/114 |
| 7,270,485 B1 * | 9/2007 | Robinson | ............... | G02B 6/4471 385/136 |
| 2004/0197066 A1 | 10/2004 | Daoud | | |
| 2014/0016905 A1 * | 1/2014 | Tanabe | ............... | G02B 6/4403 385/114 |

FOREIGN PATENT DOCUMENTS

| | | |
|---|---|---|
| JP | H03-39911 A | 2/1991 |
| JP | H09-243885 A | 9/1997 |
| JP | H10-197742 A | 7/1998 |
| JP | 2000-241629 A | 9/2000 |
| JP | 2003-302558 A | 10/2003 |
| JP | 2010-008923 A | 1/2010 |
| JP | 2013-156536 A | 8/2013 |
| JP | 2014-126667 A | 7/2014 |

OTHER PUBLICATIONS

Office Action in counterpart Japanese Patent Application No. 2017-001734, dated Jul. 3, 2018 (4 pages).
Office Action issued in corresponding Canadian Patent Application No. 2,987,357 dated Sep. 26, 2018 (4 pages).
Office Action in counterpart Japanese Patent Application No. 2017-001734 dated Dec. 21, 2018 (6 pages).

* cited by examiner

*Primary Examiner* — Omar R Rojas
(74) *Attorney, Agent, or Firm* — Osha Liang LLP

(57) ABSTRACT

An optical fiber cord includes: a multi-fiber cord section that includes an outer cover that encloses an optical fiber unit where a plurality of coated optical fibers are gathered; a plurality of branch cord sections where the coated optical fibers are housed in branch tubes; and a branch protection section that includes an exterior member that covers a branch portion where the plurality of coated optical fibers are branched from the multi-fiber cord section toward the branch cord sections.

11 Claims, 10 Drawing Sheets

OPTICAL FIBER CORD AND METHOD OF MANUFACTURING OPTICAL FIBER CORD

BACKGROUND

Field of the Invention

The present invention relates to an optical fiber cord and a method of manufacturing an optical fiber cord.

Priority is claimed on Japanese Patent Application No. 2017-001734, filed on Jan. 10, 2017, the content of which is incorporated herein by reference.

Description of Related Art

Japanese Unexamined Patent Application, First Publication No. 2003-302558 discloses an optical fiber cord in which a plurality of coated optical fibers included in an optical fiber ribbon are branched at a branch portion. In the optical fiber cord, the coated optical fibers arranged in two lines within the optical fiber ribbon are branched into each line at the branch portion (refer to FIG. 12 and the like in Japanese Unexamined Patent Application, First Publication No. 2003-302558).

Here, in this type of optical fiber cord, the coated optical fibers may be branched one by one at the branch portion and then each of the coated optical fibers may be covered with a branch tube, so that the optical fiber cord is used as a so-called fan-out cord. In a case where the coated optical fibers are branched one by one at the branch portion, the length of the branch portion in the longitudinal direction of the coated optical fibers is increased in order to prevent the coated optical fiber from being bent with a small radius of curvature, which causes increase in the transmission loss. In a case where the branch portion is long, for example, an exterior member that covers the branch portion or the like also becomes large. This causes an increase in the size of the optical fiber cord.

SUMMARY

One or more embodiments of the present invention provide a reduction in the longitudinal-direction length of a branch portion of the optical fiber cord.

According to one or more embodiments, an optical fiber cord includes: a multi-fiber cord section provided with an outer cover enclosing an optical fiber unit in which a plurality of coated optical fibers are gathered; a plurality of branch cord sections in which the coated optical fibers of the optical fiber unit are housed in branch tubes; and a branch protection section provided with an exterior member covering a branch portion at which the plurality of coated optical fibers are branched from the multi-fiber cord section toward the branch cord sections.

The optical fiber unit may include a plurality of connection portions connecting the adjacent coated optical fibers to each other and placed at intervals in a longitudinal direction of the optical fiber unit.

A method of manufacturing an optical fiber cord according to one or more embodiments of the invention is a method of manufacturing an optical fiber cord, the optical fiber cord including a multi-fiber cord section provided with an outer cover enclosing an optical fiber unit in which a plurality of coated optical fibers are gathered, a plurality of branch cord sections in which the coated optical fibers of the optical fiber unit are housed in branch tubes, and a branch protection section provided with an exterior member covering a branch portion at which the plurality of coated optical fibers are branched from the multi-fiber cord section toward the branch cord sections. The method of manufacturing an optical fiber cord includes: a step of hanging the coated optical fibers in a state where the coated optical fibers at the branch portion are movable relative to each other; a step of housing, in the branch tubes, the coated optical fibers branched at the branch portion; and a step of integrally covering an end portion of the multi-fiber cord section and end portions of the plurality of branch cord sections with the exterior member.

According to the aspects of the invention, it is possible to reduce the longitudinal-direction length of the branch portion in the optical fiber cord.

DETAILED DESCRIPTION

Hereinafter, the configuration of an optical fiber cord according to one or more embodiments will be described with reference to the diagrams. In each diagram used in the following description, the scale of each member is appropriately changed in order to make each member have a recognizable size.

Figure 1:
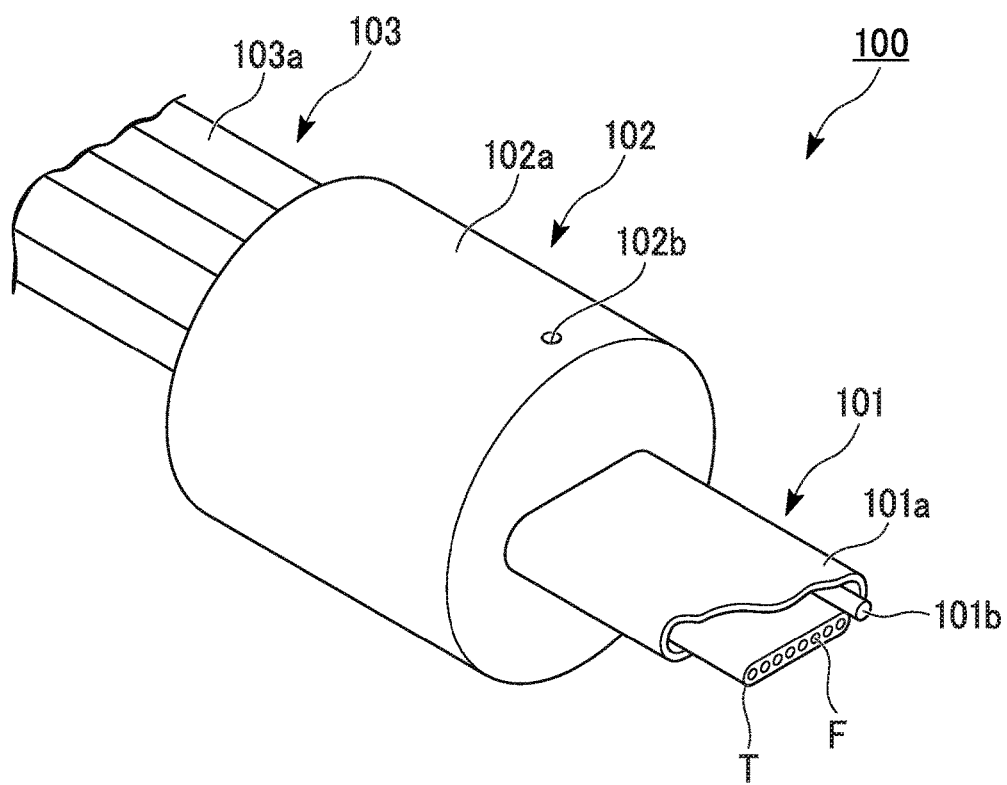
FIG. 1 is a perspective view of a branch protection section in a tape cord using an optical fiber ribbon according to one or more embodiments.
Figure 2:
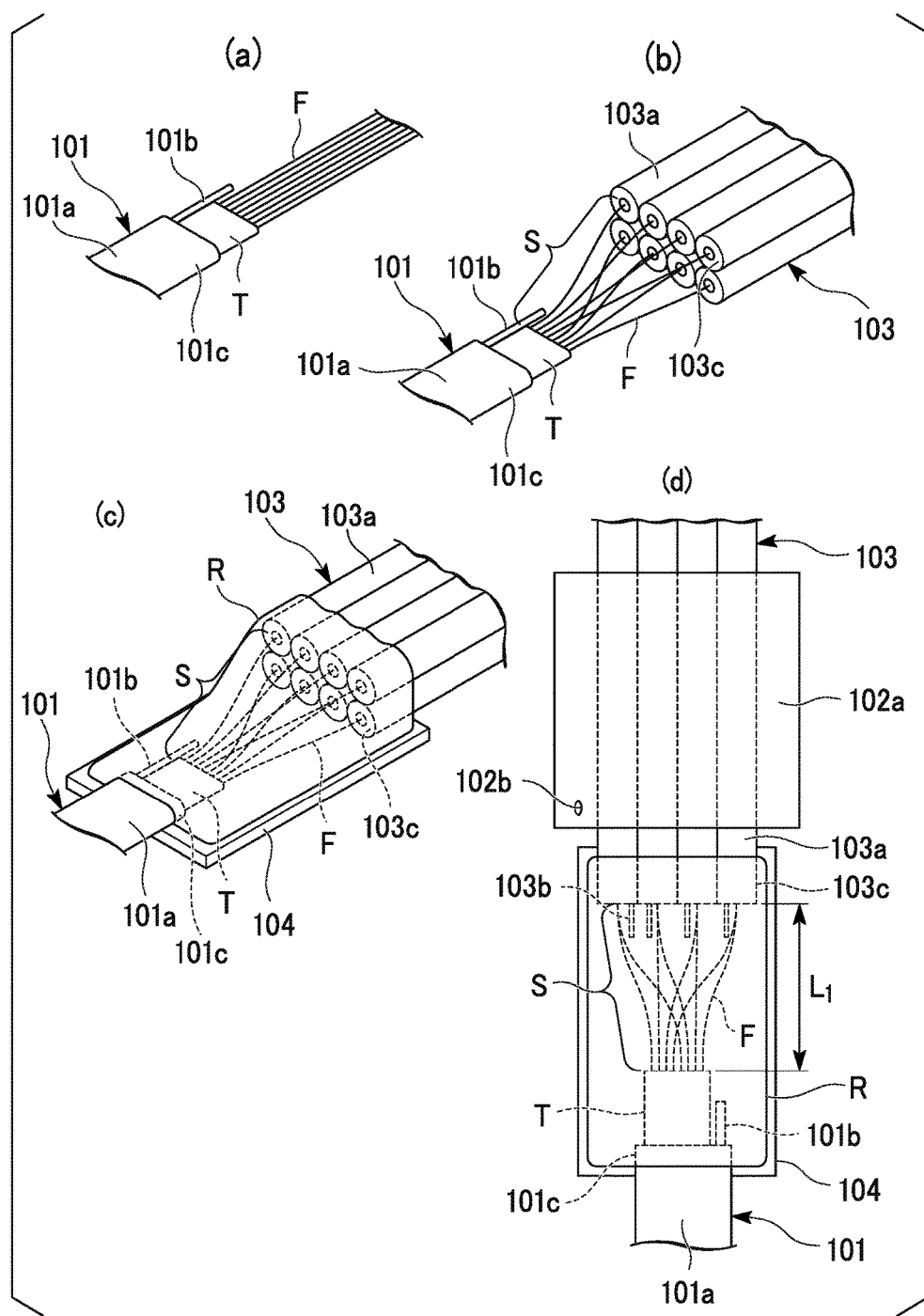
FIGS. 2(*a*)-2(*d*) are diagrams illustrating a process of manufacturing the tape cord shown in FIG. 1.

Before describing the configuration of the optical fiber cord according to one or more embodiments, the configuration of a tape cord 100 using an optical fiber ribbon T will be described with reference to FIGS. 1 to 3. As shown in FIG. 1, the tape cord 100 includes a multi-fiber cord section 101, a branch protection section 102, and a plurality of branch cord sections 103.

The multi-fiber cord section 101 has a configuration provided with an outer cover 101*a* covering the optical fiber ribbon T of eight fibers and a tensile strength body 101*b*, for example.

The branch protection section 102 has a configuration in which a plurality of coated optical fibers F in the optical fiber ribbon T are branched within a cylindrical exterior member 102*a*. The exterior member 102*a* is formed by a heat shrinkable tube, for example. As the heat shrinkable tube, for example, a resin tube containing polyvinyl chloride (PVC) or flame-retardant polyolefin, which contracts by heating up to about 100 to 160° C., as a main component can be appropriately adopted.

In the exterior member 102a, a through hole 102b passing therethrough in the thickness direction is formed. The inside of the exterior member 102a is filled with a fixing resin injected from the through hole 102b. A portion where the optical fiber ribbon T branches to a plurality of coated optical fibers F is simply referred to as a branch portion S in one or more embodiments (refer to FIG. 2).

The branch cord sections 103 have configurations included branch tubes 103a covering the coated optical fibers F branched at the branch portion S.

A method of manufacturing the tape cord 100 having the above configuration will be described with reference to FIGS. 2 and 3.

In the case of manufacturing the tape cord 100, first, the tensile strength body 101b and the optical fiber ribbon T are extended out from a first end portion of the outer cover 101a by partially cutting off the outer cover 101a (FIG. 2(a)). In this case, the optical fiber ribbon T is more extended from the outer cover 101a than the tensile strength body 101b.

Figure 3:
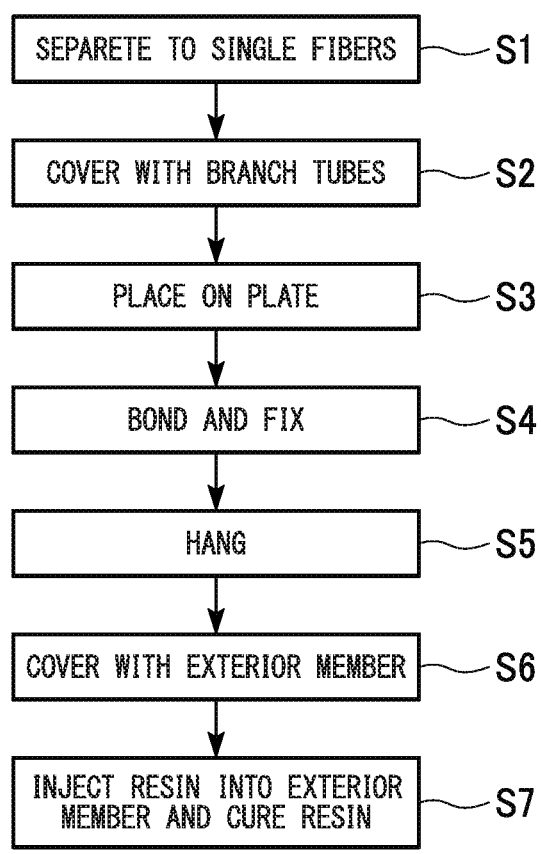
FIG. 3 is a flowchart of the process of manufacturing the tape cord shown in FIG. 1.

Then, a portion of the optical fiber ribbon T extended out from the outer cover 101a is subjected to separate to single coated optical fibers F (step S1 in FIG. 3). As a result, a plurality of coated optical fibers F in the optical fiber ribbon T extend out from the outer cover 101a in a state in which the plurality of coated optical fibers F are separated from each other.

Then, as shown in FIG. 2(b), coated optical fibers F are covered with the branch tubes 103a to form a plurality of branch cord sections 103 (step S2 in FIG. 3). In this case, the plurality of branch tubes 103a in the branch cord sections 103 are arranged in four lines and are stacked in two stages, for example. Although not shown in FIG. 2(b), the tensile strength bodies 103b are inserted into the branch tubes 103a. The tensile strength bodies 103b extend out from the first end portion 103c of the branch tubes 103a (FIG. 2(d)).

Then, as shown in FIG. 2(c), the first end portion 101c of the multi-fiber cord section 101 and the first end portions 103c of the plurality of branch cord sections 103 are placed on a plate 104 (step S3 in FIG. 3). These first end portions 101c and 103c, the branch portion S located between the first end portion 101c and the first end portions 103a, and the like are bonded and fixed to the plate 104 by a fixing resin R (step S4 in FIG. 3).

Then, as shown in FIG. 2(d), the plurality of branch cord sections 103 are hung so that the multi-fiber cord section 101 faces downward in the vertical direction (step S5 in FIG. 3). Then, the first end portion 101c of the multi-fiber cord section 101, the first end portions 103c of each branch cord section 103, the plate 104 located between the first end portions and the like are covered with the exterior member 102a (step S6 in FIG. 3). Then, in a case where the exterior member 102a is formed of a material having heat shrinkability, the exterior member 102a is heated. As a result, the exterior member 102a contracts, and opening portions at both ends of the cylindrical exterior member 102a are blocked by the multi-fiber cord section 101 and the plurality of branch cord sections 103.

Then, a fixing resin is injected from the through hole 102b of the exterior member 102a, and is cured (step S7 in FIG. 3). By the above steps, the branch protection section 102 is formed.

Then, by performing processing, such as connecting a connector to the second end portions (not shown) of the multi-fiber cord section 101 and the branch cord sections 103 not facing the branch protection section 102, as necessary, the manufacturing of the tape cord 100 is completed.

Next, the configuration of the optical fiber cord of one or more embodiments will be described with reference to FIGS. 4 to 9.

Figure 4:
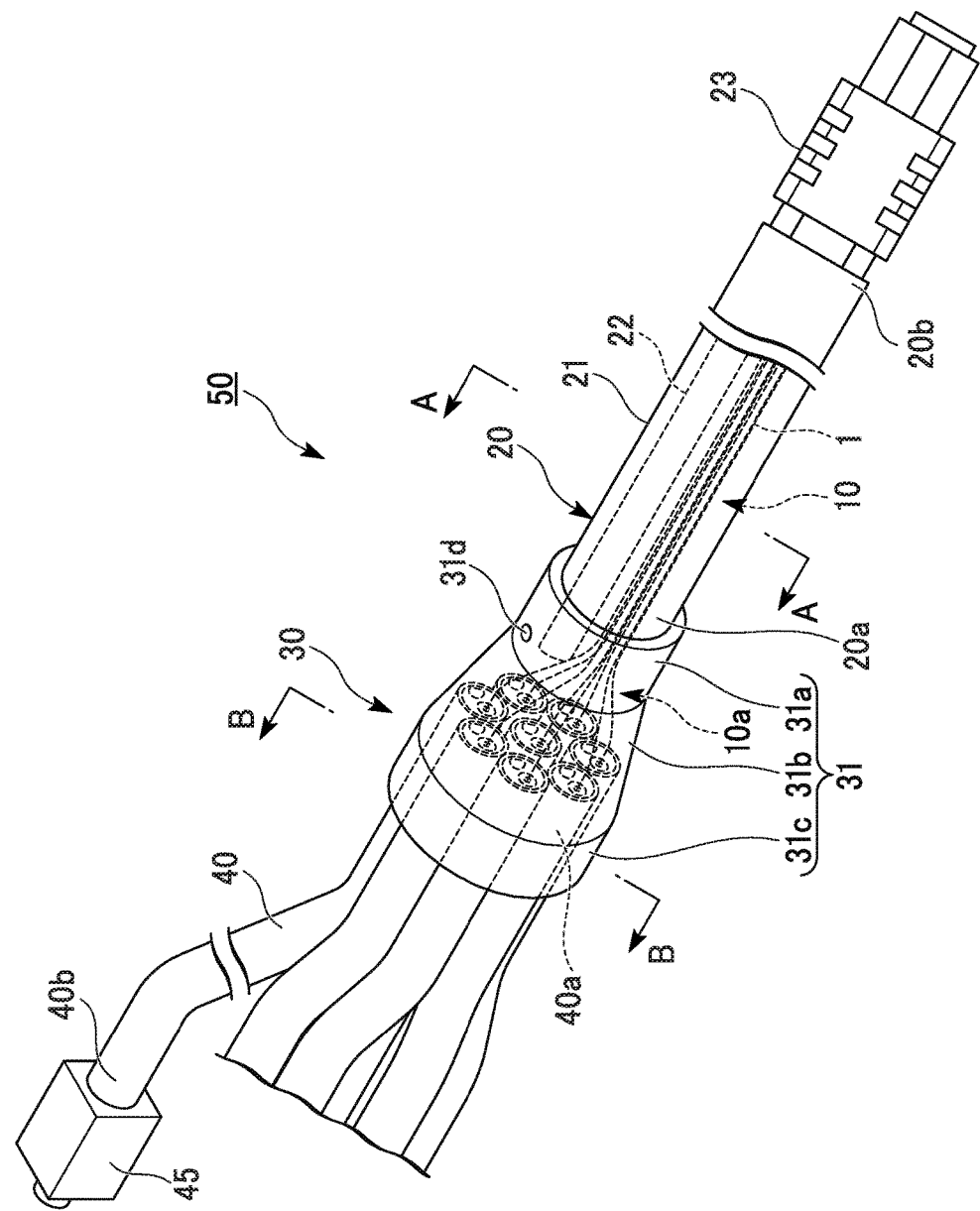
FIG. 4 is an explanatory diagram of an optical fiber cord using an intermittent bonding type optical fiber ribbon according to one or more embodiments.

As shown in FIG. 4, an optical fiber cord 50 of one or more embodiments includes a multi-fiber cord section 20, a branch protection section 30, and a plurality of branch cord sections 40.

Figure 6A:
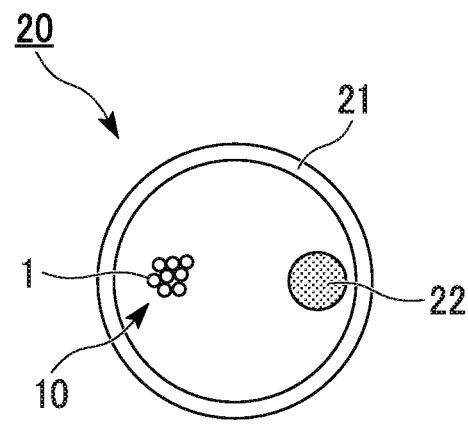
FIG. 6A is a cross-sectional view of the optical fiber cord shown in FIG. 4 taken along the line A-A of FIG. 4.

As shown in FIGS. 4 and 6A, the multi-fiber cord section 20 includes an outer cover 21 covering an optical fiber unit 10 in which a plurality of optical fibers or optical fiber cores (hereinafter, simply referred to as coated optical fibers 1) are gathered and a tensile strength body 22 extending along the longitudinal direction of the optical fiber unit 10.

In the illustrated example, the optical fiber unit 10 has eight coated optical fibers 1. As the tensile strength body 22, aramid fiber, glass fiber, carbon fiber, and the like can be used.

As shown in FIG. 4, a multi-fiber optical connector 23 is provided at a second end portion 20b of the multi-fiber cord section 20. In FIG. 4, an MPO type optical connector (F13 type optical connector specified in JIS C 5982. MPO: Multi-fiber Push On) is used as the multi-fiber optical connector 23. As the multi-fiber optical connector, for example, an MT type optical connector (MT: Mechanically Transferable. Compatible with F12 type optical connector specified in JIS C 5981 or conforming to IEC 61754-5) can also be adopted.

Figure 5:
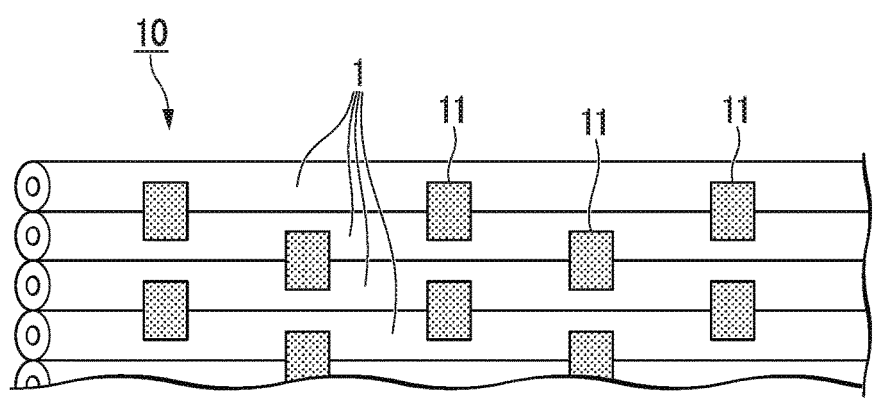
FIG. 5 is a developed view of the optical fiber unit shown in FIG. 4.

As shown in FIG. 5, the optical fiber unit 10 of one or more embodiments is a so-called intermittent fixed ribbon, and includes a plurality of connection portions 11 connecting the adjacent coated optical fibers 1 to each other and placed at intervals in a longitudinal direction of the optical fiber unit 10. More specifically, a plurality of coated optical fibers 1 are arranged side by side, and the adjacent coated optical fibers 1 are connected to each other by the connection portions 11. The connection portions 11 are disposed at fixed intervals in the longitudinal direction. A connection portion 11 that connects adjacent coated optical fibers 1 and another connection portion 11 that connects one of the adjacent coated optical fiber 1 and another coated optical fiber 1 are arranged at a position shifted in the longitudinal direction. Thus, the connection portions 11 are arranged in a zigzag manner with respect to both directions of the longitudinal direction and the width direction perpendicular to the longitudinal direction. The connection portion 11 is formed of, for example, a UV-curable resin, and is bonded to adjacent coated optical fibers 1. The coated optical fibers 1 connected to each other by the connection portion 11 may pulled by hand so as to be separated from each other in the width direction of the optical fiber unit 10, so that the connection state can be released by peeling off the connection portion 11 from the coated optical fiber 1 by hand.

Without being limited to the intermittent fixed ribbon, for example, the optical fiber unit 10 obtained by binding a plurality of coated optical fibers 1 with a binding material or the like may be used.

Figure 6B:
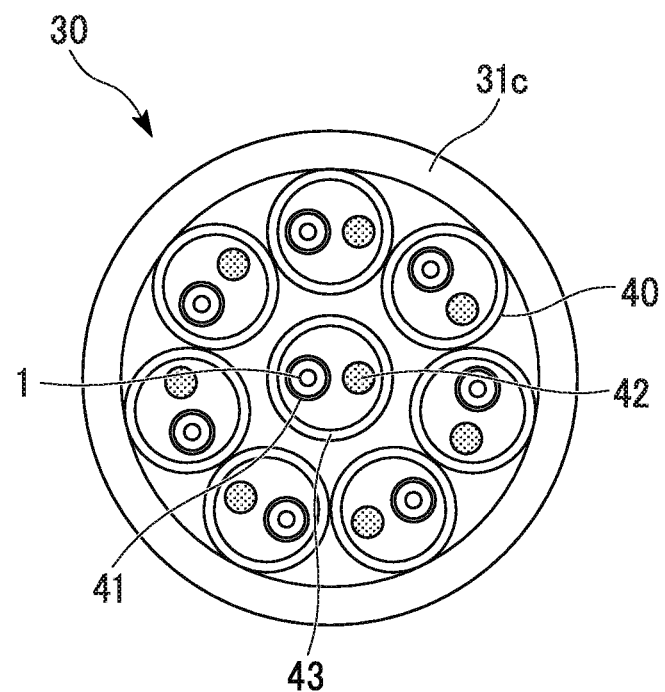
FIG. 6B is a cross-sectional view of the optical fiber cord shown in FIG. 4 taken along the line B-B of FIG. 4.

As shown in FIG. 6B, the branch cord sections 40 are configured such that the coated optical fibers 1 covered with inner tubes 41 and tensile strength bodies 42 are housed in branch tubes 43.

As shown in FIG. 4, a single-core optical connector 45 is provided at second end portions 40b of the branch cord sections 40. As the single-core optical connector 45, an SC type optical connector (SC: Single fiber Coupling optical fiber connector. Compatible with F04 type optical connector specified in JIS C 5973 or conforming to IEC 61754-4 (or IEC 61754-14)) can be suitably used. As the single-core optical connector, in addition to the SC type optical connector, for example, an LC type optical connector (conforming to JIS C 5964-20 or IEC 61754-20), an MU type optical connector (compatible with F14 type optical connector specified in JIS C 5983 or conforming to IEC 61754-6), an FC type optical connector (compatible with F01 type single-core optical connector specified in JIS C 5970 or conforming to IEC 61754-13), and the like can also be used.

The branch protection section 30 is configured such that a first end portion 20a (refer to FIG. 8) of the multi-fiber cord section 20 and the first end portions 40a of a plurality of branch cord sections 40 are covered with an exterior member 31. The exterior member 31 is a cylindrical member formed of resin. The exterior member 31 is formed by a heat shrinkable tube, for example. As a material of the heat shrinkable tube, it is possible to adopt the same material as the exterior member 102a in the tape cord 100 described above.

The exterior member 31 is formed in a two-stage cylindrical shape having a small diameter portion 31a that covers a first end portion 20a of the multi-fiber cord section 20, a diameter increasing portion 31b that covers a branch portion 10a of the optical fiber unit 10, and a large diameter portion 31c that covers first end portions 40a of a plurality of branch cord sections 40. The large diameter portion 31c has a larger diameter than the small diameter portion 31a, and the diameter increasing portion 31b connects the large diameter portion 31c and the small diameter portion 31a. The diameter of the diameter increasing portion 31b gradually increases toward the branch cord sections 40 side from the multi-fiber cord section 20 side along the longitudinal direction. A through hole 31d is formed in the small diameter portion 31a of the exterior member 31.

A method of manufacturing the optical fiber cord 50 having the above configuration will be described with reference to FIGS. 7 to 9.

Figure 7:
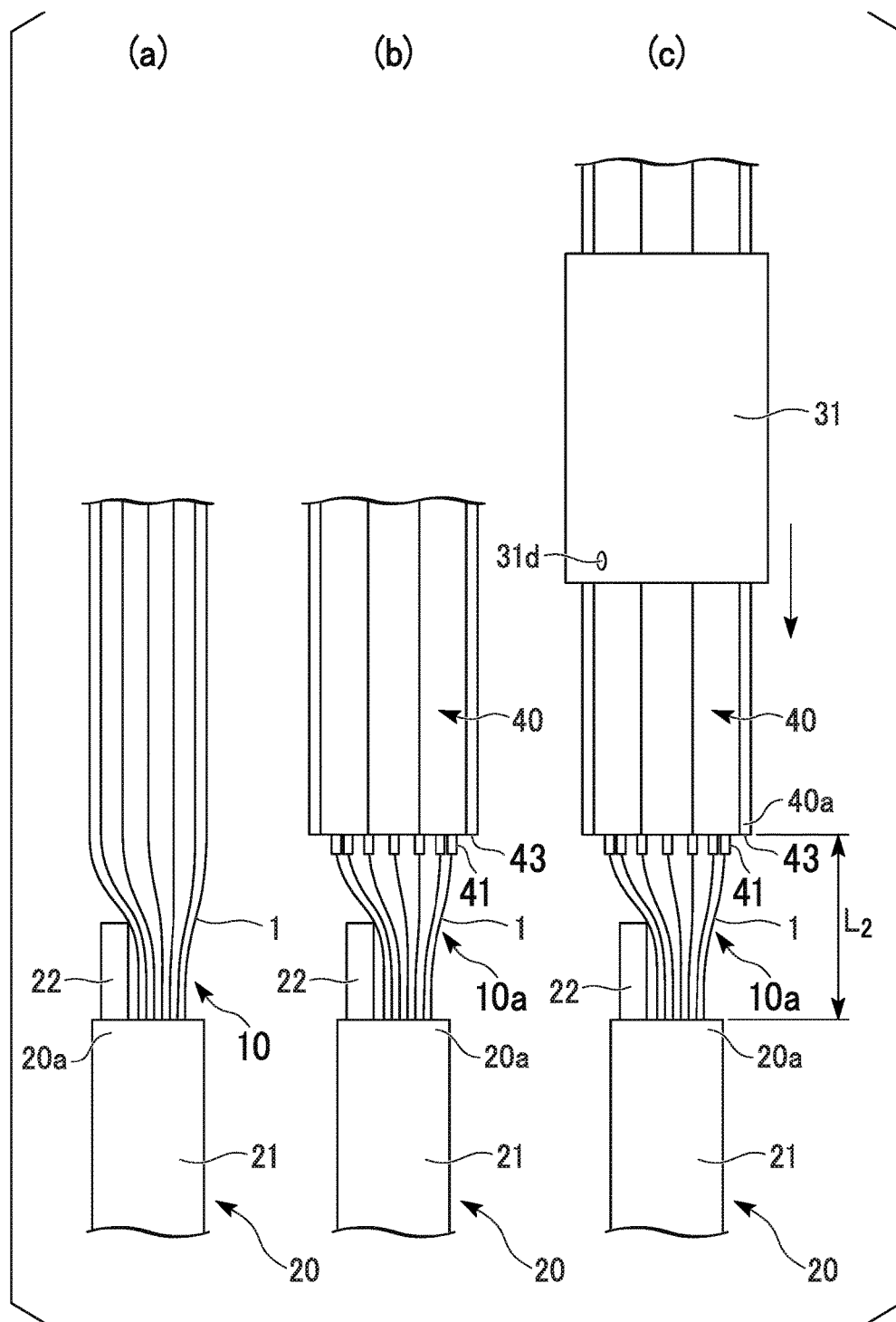
FIGS. 7(*a*)-7(*c*) are diagrams illustrating a process of manufacturing the optical fiber cord shown in FIG. 4.
Figure 8:
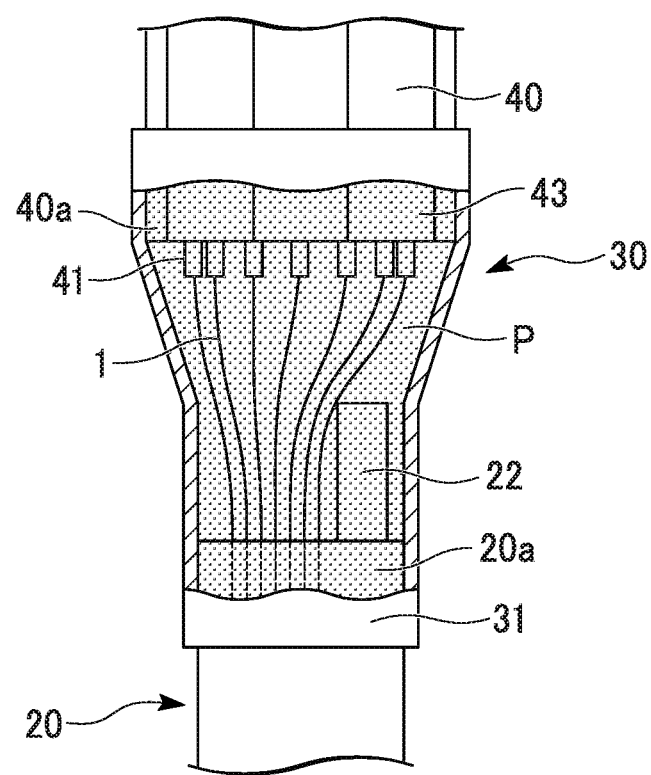
FIG. 8 is a partial cross-sectional view of the optical fiber cord shown in FIG. 4.

In the case of manufacturing the optical fiber cord 50, the tensile strength body 22 and the optical fiber unit 10 are extended out from an end of the outer cover 21 by partially cutting off the outer cover 21 in the first end portion 20a of multi-fiber cord section 20 (refer to part (a) of FIG. 7). In this case, the optical fiber unit 10 is more extended out from the outer cover 21 than the tensile strength body 22 is.

Figure 9:
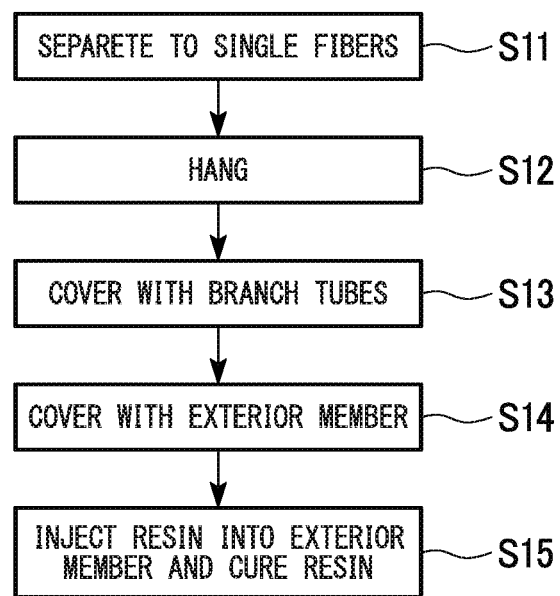
FIG. 9 is a flowchart of the process of manufacturing the optical fiber cord shown in FIG. 4.

Then, the connection portions 11 of a portion extended from the outer cover 21 in the optical fiber unit 10 are peeled off so that the coated optical fibers 1 are subjected to separate to single fibers (step S11 in FIG. 9). In this case, since the optical fiber unit 10 of one or more embodiments is an intermittent fixed ribbon, the connection portions 11 can be easily peeled off by applying a force to spread the optical fiber unit 10 in a direction perpendicular to the longitudinal direction. In this manner, a plurality of coated optical fibers 1 of the optical fiber unit 10 are branched. For example, in a case where the optical fiber unit 10 is formed by binding a plurality of coated optical fibers 1 with a binding material or the like, the plurality of coated optical fibers 1 can be easily branched by cutting the binding material.

Then, the coated optical fibers 1 are hung so that the branch portion 10a is located on the upper side (step S12 in FIG. 9). In this case, the plurality of coated optical fibers 1 of branch portion 10a are movable relative to each other.

Then, as shown in part (b) of FIG. 7, each branched coated optical fiber 1 is covered with the inner tube 41, and the branched coated optical fiber 1 covered with the inner tube 41 is housed in the branch tube 43 together with the tensile strength body 42 (step S13 in FIG. 9). In this case, although not shown, the tensile strength bodies 42 extend out from ends of the branch tube 43 in the first end portions 40a to the branch portion 10a.

Then, as shown in part (c) of FIG. 7, the first end portion 20a of the multi-fiber cord section 20, the first end portions 40a of branch cord sections 40, the branch portion 10a located between these first end portions 20a, 40a, and the like are covered with the exterior member 31 from the upper side (step S14 in FIG. 9). For example, in a state in which the exterior member 31 is externally fitted to the multi-fiber cord section 20 or a plurality of branch cord sections 40, the exterior member 31 is moved along the extension direction (longitudinal direction) of these cords to cover the branch portion 10a. In part (c) of FIG. 7, the branch portion 10a and the like are covered with the exterior member 31 moved (lowered) from above. Then, in a case where the exterior member 31 is formed of a material having heat shrinkability (in the case of a heat shrinkable tube), the exterior member 31 is heated. As a result, the exterior member 31 contracts, and opening portions at both ends of the cylindrical exterior member 31 are blocked by the multi-fiber cord section 20 and the plurality of branch cord sections 40.

Then, a liquid resin material for fixation is injected from the through hole 31d of the exterior member 31, and is cured (step S15 in FIG. 9). The liquid resin material is a curable liquid material, such as a thermoplastic resin, a thermosetting resin, an ultraviolet curable adhesive, a moisture curable adhesive, and a two liquid type adhesive. By curing the liquid resin material injected into the exterior member 31 from the through hole 31d, the inside of the exterior member 31 is filled with a resin P as shown in FIG. 8. As a result, the first end portions 20a, 40a of the multi-fiber cord section 20 and the branch cord sections 40, and the coated optical fibers 1 located therebetween are fixed within the exterior member 31. By the above steps, the branch protection section 30 is formed.

Then, by performing processing, such as connecting the multi-fiber optical connector 23 and the single-fiber optical connector 45 to second end portions 20b, 40b of the multi-fiber cord section 20 and branch cord sections 40, which are not facing the branch protection section 30, as necessary, the manufacturing of the optical fiber cord 50 is completed.

Next, the configuration and the manufacturing steps of the tape cord 100 will be compared to the configuration and the manufacturing steps of the optical fiber cord 50.

In the case of manufacturing the tape cord 100, the plate 104 is used as shown in FIG. 2(c) and the like. This is because, in the optical fiber ribbon T, the coated optical fibers F are collectively covered in a state in which the coated optical fibers F are arranged in a line.

Specifically, for example, in the state shown in FIG. 2(b), the coated optical fibers F cannot move relative to each other in a portion of the coated optical fibers F that are collectively covered (hereinafter, referred to as a collectively covered portion). On the other hand, at the branch portion S, each coated optical fiber F extending from the collectively covered portion extends so as to spread toward each branch tube 103a. Therefore, the posture of the coated optical fibers F easily changes abruptly in the vicinity of the outlet of the collectively covered portion. In particular, in a case where the branch tube 103a moves relative to the optical fiber ribbon T, the coated optical fibers F located at the branch portion S are pulled and moved by the branch tubes 103a. For this reason, in the vicinity of the outlet of the collectively covered portion, there is a concern that the coated optical fibers F will be bent at a small radius of curvature to be broken, or micro-bending will occur, or local side pressure will act to increase the transmission loss.

The coated optical fibers F located at the branch portion S try to keep the straight shape between the branch tubes 103a and the collectively covered portion due to its own rigidity. Therefore, for example, in a case where the distance between the collectively covered portion and the branch tubes 103a is shorter than the length of the coated optical fiber F located therebetween, the coated optical fibers F bend, and a downward pressing force acts on the collectively covered portion due to the rigidity of the coated optical fibers F. On the other hand, in a case where the distance between the collectively covered portion and the branch tubes 103a is smaller than the length of the coated optical fiber F located therebetween, the collectively covered portion is pulled by the tension of the coated optical fibers F. In this manner, in a case where the covered portion is pushed down or pulled, the covered portion is pressed against the opening end of the outer cover 101a. As a result, since local side pressure acts on the coated optical fibers F within the collectively covered portion, the transmission loss may increase.

Therefore, in the case of manufacturing the tape cord 100, in order to stably assemble the branch protection section 102 by avoiding the above phenomenon, the optical fiber ribbon T and the branch tubes 103a are placed on the plate 104 and are fixed by the resin R, thereby stabilizing the positional relationship therebetween.

On the other hand, the plate 104 is not used in the method of manufacturing the optical fiber cord 50. This is because the optical fiber unit 10 included in the optical fiber cord 50 is not collectively covered. More specifically, in the optical fiber unit 10, since the coated optical fibers 1 are just intermittently connected to each other by the connection portion 11. Accordingly, even if the coated optical fibers 1 are connected to each other by the connection portions 11, the coated optical fibers 1 can easily move relative to each other. For this reason, in the vicinity of the opening end of the outer cover 21, each coated optical fiber 1 moves relative to each branch tube 43 so as to spread gently. Therefore, as compared with the tape cord 100, it is possible to suppress a reduction in the radius of curvature at which the coated optical fiber 1 is bent.

For example, in the state shown in part (b) of FIG. 7, even in a case where the distance between the multi-fiber cord section 20 and the branch tubes 43 changes, the coated optical fibers 1 naturally move relative to each other within the outer cover 21 in accordance with the distance change. Therefore, it is also possible to suppress the phenomenon that the coated optical fibers 1 are pressed against the outer cover 21 and local side pressure acts thereon.

As described above, in the optical fiber cord 50, compared with the tape cord 100, there is little concern that the coated optical fibers 1 will be broken or local side pressure will act. Therefore, even if the multi-fiber cord section 20 and the branch cord sections 40 are not fixed using the plate 104, it is possible to stably assemble the branch protection section 30.

Then, the size of the branch protection section of the tape cord 100 is compared with the size of the branch protection section of the optical fiber cord 50.

First, in the case of the tape cord 100, in extending the coated optical fibers F from the collectively covered portion, the coated optical fibers F are arranged in a line as shown in FIG. 2(a)-2(d).

In addition, as shown in FIG. 2(c) and the like, the branch tubes 103a are stacked on the plate 104. Therefore, in order to prevent the coated optical fibers F from being bent at a small radius of curvature at the outlet of the covered portion, it is necessary to increase a length $L_1$ (FIG. 2(d)) of the branch portion S in the longitudinal direction to some extent. In an example, in the case of this type of tape cord 100, it is necessary to secure the length $L_1$ of about 15 mm in order to suppress the transmission loss of the coated optical fiber F. As a result, the length in the longitudinal direction of the plate 104 on which the branch portion S is placed or the length in the longitudinal direction of the exterior member 102a covering the branch portion S increases. This causes an increase in the size of the branch protection section 102.

On the other hand, in the case of the optical fiber cord 50, in extending the coated optical fibers 1 from the end portion of the outer cover 21, the coated optical fibers 1 are not arranged in a line but are dispersed to some extent within the outer cover 21. In addition, the coated optical fibers 1 can move relative to each other to some extent within the outer cover 21 as described above. For this reason, even if a length $L_2$ (refer to part (c) of FIG. 7) of the branch portion 10a in the longitudinal direction is reduced, a plurality of coated optical fibers 1 naturally move relative to each other within the outer cover 21 so as to spread gently. As a result, it is possible to suppress a reduction in the radius of curvature at which the coated optical fiber 1 is bent. Therefore, it is possible to make the branch protection section 30 small by setting the length $L_2$ of the branch portion 10a to be smaller than the length $L_1$ of the branch portion S in the tape cord 100. In an example, even if $L_2$ is 5 mm or less, it is possible to suppress the local lateral pressure acting on the coated optical fiber 1 and the occurrence of micro-bending.

In the case of the optical fiber cord 50, an intermittent fixed ribbon is used as the optical fiber unit 10. Therefore, in step S11 in FIG. 9, it is possible to easily separate the connection portion 11 to branch the plurality of coated optical fibers 1.

In the above-described method of manufacturing the optical fiber cord 50, unlike in the case of the tape cord 100, there is no step of fixing the coated optical fiber 1 or the like to the plate 104. Therefore, it is possible to manufacture the optical fiber cord 50 with fewer manufacturing steps.

In addition, it should be understood that the technical scope of the invention is not limited to the above embodiments, but various modifications can be made without departing from the spirit and scope of the invention.

Figure 10:
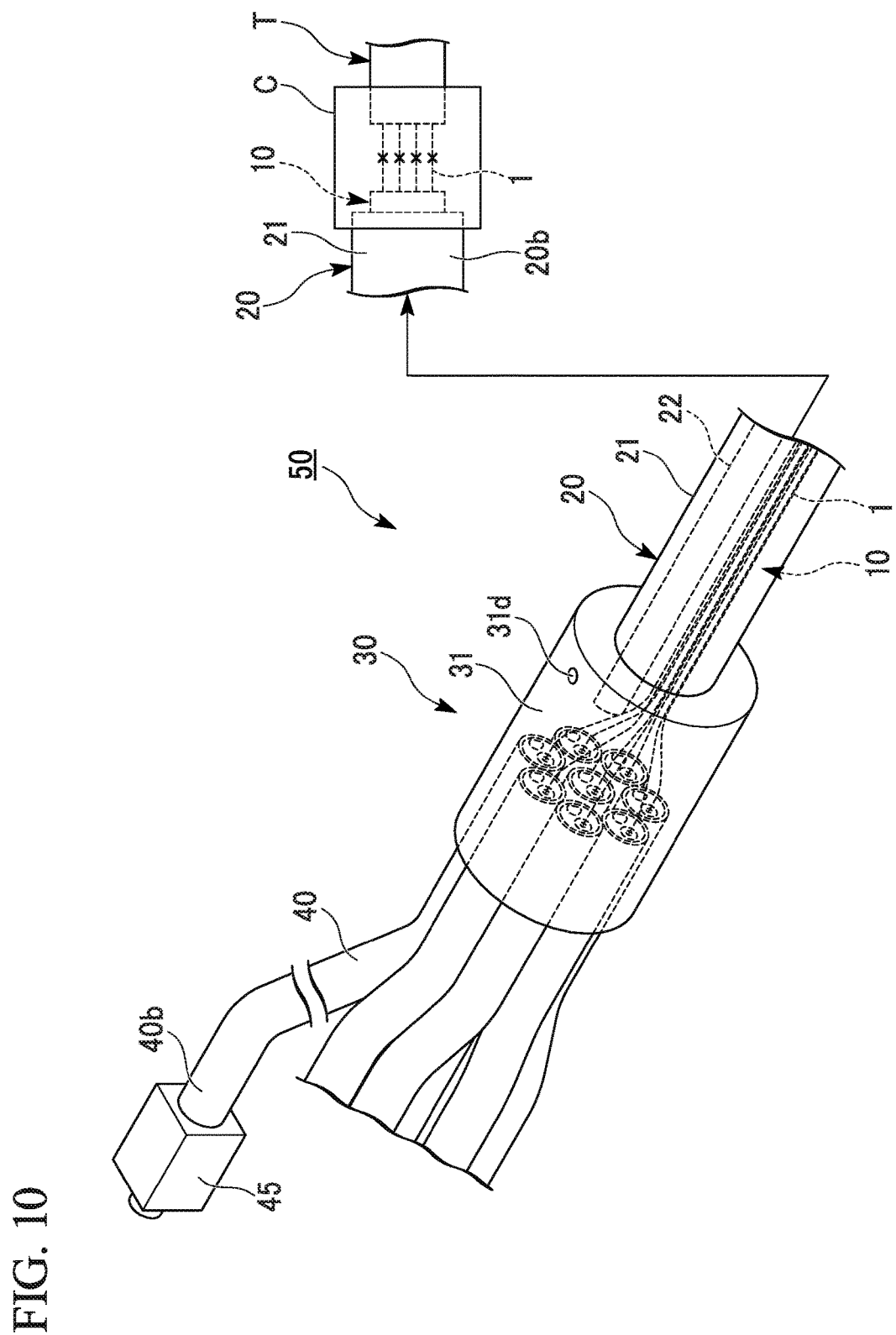
FIG. 10 is an explanatory diagram of an optical fiber cord according to a modification example of one or more embodiments.

For example, although a configuration using the exterior member 31 whose diameter changes along the longitudinal direction has been described in the above embodiments, the invention is not limited thereto. For example, as shown in FIG. 10, the diameter of the exterior member 31 may be uniform along the longitudinal direction. In this case, a hard resin or the like may be used as a material of the exterior member 31.

In addition, as shown in FIG. 10, the second end portion of the multi-fiber cord section 20 not facing the branch protection section 30 may be fusion-spliced to another optical fiber ribbon T or the like. In the example shown in FIG. 10, the multi-fiber cord section 20 and the optical fiber ribbon T are collectively fusion-spliced together, and this connection portion is covered with a case body C for protection.

It is also possible to appropriately replace the components in the above embodiments with known components without departing from the scope of the invention, and the above embodiments or modification examples may be appropriately combined.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An optical fiber cord, comprising:
   a multi-fiber cord section comprising an outer cover that encloses:
      an optical fiber unit where a plurality of coated optical fibers are gathered, and
      a first tensile strength body;
   a plurality of branch cord sections in which the coated optical fibers and second tensile strength bodies are housed in branch tubes; and
   a branch protection section comprising an exterior member that covers the first tensile strength body, the second tensile strength bodies, and a branch portion where the plurality of coated optical fibers are branched from the multi-fiber cord section toward the branch cord sections, wherein
   a fixing resin is filled inside of the exterior member, and the plurality of coated optical fibers and first end portions of the plurality of branch cord sections are fixed by the fixing resin within the exterior member.

2. The optical fiber cord according to claim 1, wherein the optical fiber unit includes a plurality of connection portions that connect the adjacent coated optical fibers to each other and are placed at intervals in a longitudinal direction of the optical fiber unit.

3. A method of manufacturing an optical fiber cord, the optical fiber cord including a multi-fiber cord section comprising an outer cover that encloses an optical fiber unit in which a plurality of coated optical fibers are gathered, a plurality of branch cord sections in which the coated optical fibers are housed in branch tubes, and a branch protection section comprising an exterior member that covers a branch portion where the plurality of coated optical fibers are branched from the multi-fiber cord section toward the branch cord sections, the method comprising:
   hanging the coated optical fibers in a state where the coated optical fibers at the branch portion are movable relative to each other;
   housing, in the branch tubes, the coated optical fibers branched at the branch portion;
   integrally covering a first end portion of the multi-fiber cord section and first end portions of the plurality of branch cord sections with the exterior member; and
   filling a fixing resin inside of the exterior member, and fixing the plurality of coated optical fibers and the first end portions of the plurality of branch cord sections with the fixing resin within the exterior member, wherein
   the outer cover further encloses a first tensile strength body,
   the branch tubes further house second tensile strength bodies, and
   the exterior member further covers the first tensile strength body and the second tensile strength bodies.

4. The optical fiber cord according to claim 1, wherein
   the first tensile strength body extends out from the outer cover at a first end portion of the multi-fiber cord section, and
   the second tensile strength bodies extend out from each of the branch tubes at first end portions of the plurality of branch cord sections.

5. The optical fiber cord according to claim 1, wherein a first end portion of the multi-fiber cord section, the branch portion, the first tensile strength body, and the second tensile strength bodies are bonded by the fixing resin.

6. The optical fiber cord according to claim 1, wherein the exterior member has a through hole passing in a thickness direction of the exterior member.

7. An optical fiber cord, comprising:
   a multi-fiber cord section comprising an outer cover that encloses:
      an optical fiber unit where a plurality of coated optical fibers are gathered, and
      a first tensile strength body;
   a plurality of branch cord sections in which the coated optical fibers and second tensile strength bodies are housed in branch tubes; and
   a branch protection section comprising an exterior member that covers the first tensile strength body, the second tensile strength bodies, and a branch portion where the plurality of coated optical fibers are branched from the multi-fiber cord section toward the branch cord sections, wherein
   a fixing resin is filled inside of the exterior member, and the plurality of coated optical fibers, the multi-fiber cord section, the first tensile strength body, and the second tensile strength body are fixed by the fixing resin within the exterior member.

8. The optical fiber cord according to claim 7, wherein the optical fiber unit includes a plurality of connection portions that connect the adjacent coated optical fibers to each other and are placed at intervals in a longitudinal direction of the optical fiber unit.

9. The optical fiber cord according to claim 7, wherein
   the first tensile strength body extends out from the outer cover at a first end portion of the multi-fiber cord portion, and
   the second tensile strength bodies extend out from each of the branch tubes at first end portions of the plurality of branch cord sections.

10. The optical fiber cord according to claim 7, wherein a first end portion of the multi-fiber cord portion, first end portions of the plurality of branch cord sections, the branch portion, the first tensile strength body, and the second tensile strength bodies are bonded by the fixing resin.

11. The method of manufacturing an optical fiber cord according to claim 3, wherein
   when filling the fixing resin inside of the exterior member, the multi-fiber cord section, the first tensile strength body, and the second tensile strength body are fixed with the plurality of coated optical fibers, and the first end portions of the plurality of branch cord sections by the fixing resin.

* * * * *